United States Patent [19]
Petty

[11] Patent Number: 5,868,102
[45] Date of Patent: Feb. 9, 1999

[54] CONSTRUCTION FOR A PET CAT WITH VARIABLE INTERNAL AMBIENT LIGHT LEVELS

[76] Inventor: Gregory Petty, 27 Chestnut St., Islip, N.Y. 11751

[21] Appl. No.: 961,933

[22] Filed: Oct. 31, 1997

[51] Int. Cl.⁶ .................................................. A01K 29/00
[52] U.S. Cl. ............................................................. 119/706
[58] Field of Search .................................... 119/702, 51.1

[56] References Cited

U.S. PATENT DOCUMENTS

| | | | |
|---|---|---|---|
| 3,857,364 | 12/1974 | Miller, Jr. | 119/1 |
| 4,400,904 | 8/1983 | Baker | 43/131 |
| 4,727,825 | 3/1988 | Houghton | 119/29 |
| 4,841,911 | 6/1989 | Houghton | 119/29 |
| 5,050,536 | 9/1991 | Baker | 119/702 |
| 5,054,427 | 10/1991 | Hoover | 119/29 |
| 5,078,094 | 1/1992 | Hoover | 119/15 |
| 5,577,464 | 11/1996 | Wellington et al. | 119/475 |
| 5,709,165 | 1/1998 | Nurmikko | 119/702 |

*Primary Examiner*—Thomas Price
*Attorney, Agent, or Firm*—Myron Amer P.C.

[57] ABSTRACT

A cardboard construction for use with a pet cat providing a tunnel-like maze of walk-through passages into which there is an entry of ambient light and correspondingly various sites of different levels of ambient light within the passages as a function of the distances between the point of ambient light entry and the sites, and wherein the pet cat in the exercise of natural instincts selects sites for eating, sleeping, playing, and like routines.

1 Claim, 1 Drawing Sheet

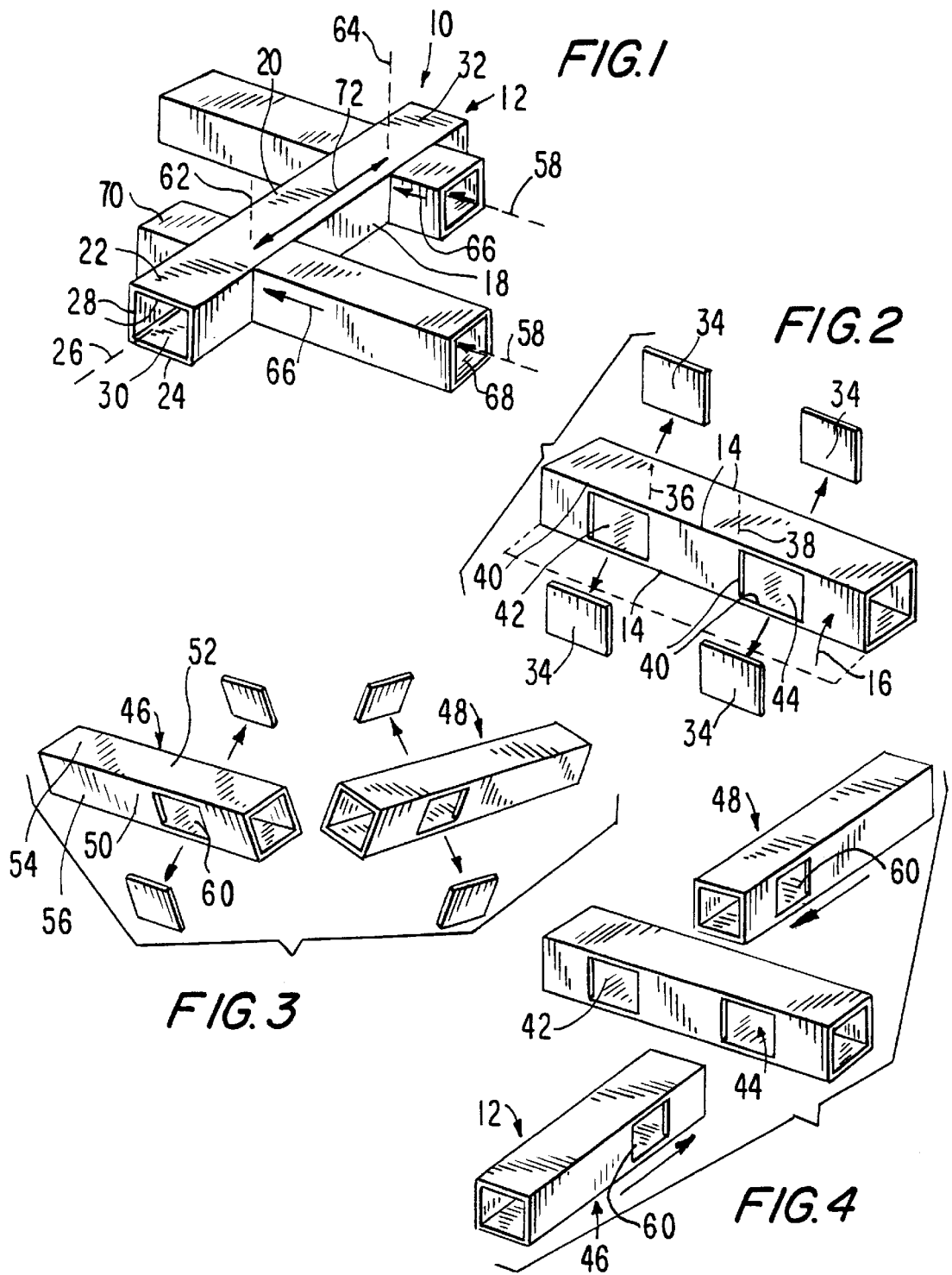

5,868,102

CONSTRUCTION FOR A PET CAT WITH VARIABLE INTERNAL AMBIENT LIGHT LEVELS

The present invention relates generally to improvements for caring for a pet cat, the improvements more particularly being embodied in a construction or housing designed for use by the pet cat and being significantly effective for this end use in that said effectiveness is derived more from the exercise of natural instincts of the pet cat than from extensive training.

EXAMPLES OF THE PRIOR ART

There are already well documented in the prior patents constructions for indoor pet cats, such as U.S. Pat. No. 5,050,536 for "Playhouse For Cats" issued to Reginald D. Baker on Sep. 24, 1991 and U.S. Pat. No. 3,618,568 for "Pet House" issued to Earl W. Breeden on Nov. 9, 1971, to mention but a few of these prior patents. These pet structures typically have graphic designs and the like which provide a pleasing appearance and, for their primary utility do little more than segregate from the pet owner's premises an area devoted to the care and maintenance of the pet cat. While noteworthy to varying extents, these and all other known prior so-called pet cat "houses" contemplate training the pet cat to achieve their effective use in contrast to bringing forth the exercise of the natural instincts of the pet cat.

Broadly, it is an object to provide a construction for maintaining a pet cat overcoming the foregoing and other shortcomings of the prior art.

More particularly, it is an object to provide a pet cat housing construction that has the utilitarian value to accommodate the exercise of natural instincts of the pet cat, such as the pet cat's eating, sleeping, playing and like routines, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of the within inventive three-component construction for a pet cat shown in its assembled condition;

FIGS. 2, 3 and 4 are similarly perspective views, in sequence, of the assembly procedure, wherein FIG. 2 illustrates the preparation for assembly of a main tunnel component;

FIG. 3 illustrates the preparation of a first and second auxiliary tunnel components; and FIG. 4 illustrates the completion of the assembly of the FIG. 3 auxiliary tunnel components with the main tunnel component of FIG. 2.

Shown in FIG. 1 is a three-component construction, generally designated 10, for the maintaining of a pet cat which, in its assembled or in-use condition has significant utility for this end use since, as will be better understood as the description proceeds, there are varying degrees of ambient light within the construction 10 which, it has been observed in practice, the pet cat uses for such routines as eating, sleeping, playing, and peering outwardly from the security of the construction 10 into the surrounding area, and like routines.

One component is an aptly called main tunnel, generally designated 12, unfoldable from a flat storage configuration shown in phantom perspective in FIG. 2 about fold lines, individually and collectively designated 14, in a pivotal traverse 16 into a three dimensional in-use rectangular configuration having opposite sides 18 and 20, a top 22, and a bottom 24 walls of cardboard construction material which bound a main walk-through passage 26 in communication with edges 28-bounded opposite end openings 30 and 32 for entry into and exiting from the walk-through main passage 26.

In preparation for assembly, the main tunnel 12 is embodied, by removal of panels 34 along perforated lines or the like at lengthwise spaced apart locations, as at 36 and 38 which, as a result of the removal of the panels 34 from both tunnel sides 18 and 20 results in a pair of edges 40-bounded tunnel-positioning openings 42 and 44 in widthwise alignment with openings produced similarly by the removal of panels 34 on the opposite tunnel side.

Next, as shown in FIGS. 3 and 4, assembled to the main tunnel 12 are substantially identical first and second auxiliary tunnels 46 and 48, the description of the first auxiliary tunnel 46 which now follows, sufficing also for the second auxiliary tunnel 48 and accordingly designated by the same reference numbers.

More particularly the first, and also the second, auxiliary tunnel 46 has opposite sides 50 and 52, a top 54, and bottom 56 walls bounding a rectangular first, and also a second, walk-through auxiliary passage 58. The first and second auxiliary tunnels 46 and 48 also undergo panel removal to produce aligned tunnel-interconnecting openings 60 in widthwise alignment, at which, as at intersection locations 62 and 64, the first and second auxiliary tunnel passages 58 are in communication with the main tunnel passage 26 and the auxiliary tunnels 46 and 48 are projected through the openings 42 and 44 in transverse relation to the directional orientation of the main tunnel 12 in their three dimensional in-use configuration, while permitting disassembly from each other and the folding of the tunnels into their flat compact conditions more suitable for storage and transportation.

From the foregoing, it should be readily understood that a diminishing gradient of ambient light, designated by the reference arrows 66, extends inwardly as a factor of proximity to the end openings 30, 32, 68, 70 to the intersections 62, 64 and that the site of the nominal ambient light exists in the length portion 72 of main tunnel passage 26 within or between the intersections 62, 64. In at least the length portion 72 it has been observed that a pet cat is likely to follows its sleeping routine, whereas in areas just inward of the end openings 30, 32, 68 and 70 it is likely to follow its eating, playing and outward peering routines.

While the pet cat construction herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A construction for a pet cat having varying ambient light levels therein to contribute to play value for said pet cat, said construction comprising a main tunnel disposed in a directional orientation having opposite side, a top and bottom walls bounding a rectangular walk-through main passage in communication with edge-bounded opposite end openings for entry into and exiting from said walk-through main passage, said main tunnel in said opposite side walls having lengthwise spaced-apart first and second widthwise oriented aligned edge-bounded tunnel-positioning openings, a pair of first and second auxiliary tunnels each having opposite side, a top and bottom walls bounding rectangular first and second walk-through auxiliary passages each in communication with edge-bounded opposite end openings for entry into and exiting from a cooperating first and second walk-through auxiliary passage, said auxiliary tunnels having operative positions disposed in projected relation through a cooperating tunnel-positioning opening so as to be in assembled connection to said main tunnel in directions oriented transversely thereto, said assembly of said main tunnel and said auxiliary tunnels having an operative position of being in a horizontal orientation on a support surface so as to permit entry of a cat on said support surface into said opposite end openings of said main tunnel and opposite end openings of said auxiliary tunnels, and in each auxiliary tunnel an edge-bounded widthwise aligned tunnel-interconnecting opening located at each intersection with said main tunnel, whereby ambient light is of a maximum extent in said walk-through auxiliary passages and said walk-through main passage outwardly of said tunnel intersections, and is of a nominal extent in said walk-through main passage inwardly of said tunnel intersections as a function of the proximity of said end openings of said tunnels.

* * * * *